US008477700B2

(12) United States Patent
Dos Santos et al.

(10) Patent No.: US 8,477,700 B2
(45) Date of Patent: Jul. 2, 2013

(54) METHOD AND ARRANGEMENT FOR RESOURCE ALLOCATION

(75) Inventors: Ricardo Brauner Dos Santos, Fortaleza-Ce (BR); Walter Cruz Freitas, Jr., Fortaleza-Ce (BR); Francisco Rafael Marques Lima, Fortaleza-Ce (BR); Francisco Porto Cavalcanti, Fortaleza-Ce (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 776 days.

(21) Appl. No.: 12/600,405

(22) PCT Filed: Nov. 5, 2007

(86) PCT No.: PCT/BR2007/000300
§ 371 (c)(1),
(2), (4) Date: Nov. 16, 2009

(87) PCT Pub. No.: WO2008/144859
PCT Pub. Date: Dec. 4, 2008

(65) Prior Publication Data
US 2010/0150088 A1    Jun. 17, 2010

(51) Int. Cl.
*H04W 4/00*    (2009.01)
(52) U.S. Cl.
USPC .......................................... 370/329
(58) Field of Classification Search
USPC .......................................... 370/329
See application file for complete search history.

(56) References Cited

U.S. PATENT DOCUMENTS

| 2004/0208183 | A1* | 10/2004 | Balachandran et al. . 370/395.21 |
| 2007/0140167 | A1* | 6/2007 | Jang et al. ...................... 370/329 |
| 2007/0153697 | A1* | 7/2007 | Kwan et al. ................... 370/235 |
| 2008/0159122 | A1* | 7/2008 | Dor .............................. 370/208 |

FOREIGN PATENT DOCUMENTS

WO    WO 2004014099    2/2004

OTHER PUBLICATIONS

International Search Report for PCT/BR2007/000300, mailed Sep. 5, 2008.
Damji, N. et al., "Adaptive downlink multi-carrier resource allocation for real-time multimedia traffic in cellular systems", Communications, (Jun. 20-24, 2004), pp. 4258-4262.
Svedman, P. et al., "Opportunistic Beamforming and Scheduling for OFDMA Systems", IEEE Transactions on Communications, vol. 55, No. 5, (May 1, 2007), pp. 941-952.

(Continued)

*Primary Examiner* — Brandon Renner
*Assistant Examiner* — Shaq Taha
(74) *Attorney, Agent, or Firm* — Nixon & Vanderhye, P.C.

(57) ABSTRACT

A method for resource allocation in a wireless communication system, having a set of connected terminals, comprises allocating of transmission resources and assigning of transmission resources. The allocating in turn comprises estimating of a requirement value representing an amount of required transmission resources for satisfying a minimum quality of service during a next transmission time interval for respective connected terminal. An allocation subset is generated by including unsatisfied connected terminals so that the sum of the requirement values of the included connected terminals of the allocation subset equals available transmission resources. The generation of the allocation subset is performed by including connected terminals in an order according to the respective requirement values, starting with the lowest requirement value. The assigning of transmission resources is thereafter performed by assigning transmission resources of the next transmission time interval to connected terminals of the allocation subset.

20 Claims, 9 Drawing Sheets

OTHER PUBLICATIONS

Gross et al, "Dynamic Mechanisms in OFDM Wireless Systems: A Survey on Mathematical and System Engineering Contributions", Technical University Berlin Telecommunication Networks Group, Berlin, May 2006.

Kim et al, "A Proportional Fair Scheduling for Multicarrier Transmission Systems", IEEE Communications Letter, vol. 9, No. 3, 2005, pp. 210-212.

Yanhui et al, Downlink Scheduling and Radio Resource Allocation in Adaptive OFDMA Wireless Communication Systems for User-Individual QoS, Transactions on Engineering, Computing and Technology; World Enformatika Society, Mar. 2006, pp. 221-225.

Nguyen et al, "A Proportional Fairness Algorithm with QoS Provision in Downlink OFDMA Systems", IEEE Communications Letter, vol. 10, No. 11, Nov. 2006.

Wong et al, "A Low Complexity Algorithm for Proportional Resource Allocation in OFMDA Systems", IEEE Workshop on Signal Processing Systems, Oct. 2004.

\* cited by examiner

0/11 satisfied

# METHOD AND ARRANGEMENT FOR RESOURCE ALLOCATION

This application is the U.S. national phase of International Application No. PCT/BR2007/000300 filed 5 Nov. 2007, which designated the U.S. and claims the benefit of U.S. Provisional No. 60/924,751 filed 30 May 2007, the entire contents of each of which are hereby incorporated by reference.

TECHNICAL FIELD

The technology disclosed herein relates in general to methods and arrangements for resource allocation in wireless communication systems.

BACKGROUND

It is expected future wireless communication networks based on Orthogonal Frequency Division Multiple Access (OFDMA) will be capable of serving a greater number of users with fulfilled Quality of Service (QoS) and having higher system spectral efficiency compared to past and present systems. Downlink scheduling and Radio Resource Allocation (RRA) algorithms have a key role in succeeding in this task, due to their capacity to adapt operation to the time variant wireless channels.

The research in scheduling and RRA algorithms in OFDMA networks has in general focused in assuring some kind of fairness among users while increasing system spectral efficiency. Examples may be found in e.g. "Downlink Scheduling and Radio Resource Allocation in Adaptive OFDMA Wireless Communication Systems for User-Individual QoS," Transactions on Engineering, Computing and Technology—World Enformatika Society, March 2006, by Lu Yanhui, Wang Chunming, Yin Changchuan and Tue Guangxin [1], or in "A Proportional Fairness Algorithm with QoS Provision in Downlink OFDMA Systems," IEEE Communications Letters, v.10, n.11, November 2006, by Tien-Dzung Nguyen and Youngnam Han [2], or in "A Low Complexity Algorithm for Proportional Resource Allocation in OFDMA Systems," IEEE Workshop on Signal Processing Systems, pp.1-6, October 2004, by I. C. Wong, Zukang Shen, B. L. Evans and J. G. Andrews [3]. One shortcoming of the state-of-art scheduling and RRA algorithms is that they do not address whether the users of the system becomes satisfied or not.

One approach, the Rate Maximization (RM), represents the upper bound in the system spectral efficiency, e.g. as shown by J. Gross and M. Bohge, "Dynamic Mechanisms in OFDM Wireless Systems: A Survey on Mathematical and System Engineering Contributions," Telecommunication Networks Group (TKN) Technical Report TKN-06-001, Technical University Berlin, Germany, May 2006 [4]. This algorithm assigns a given subcarrier to the user that experiences the highest channel gain on it. Regarding the RM scheduler, although it achieves a high system spectral efficiency, it is generally known that this scheduling algorithm provides starvation of terminals being present in the vicinity of a cell edge.

Margin Adaptive (MA) and Rate Adaptive (RA) approaches are RRA problems designed to achieve different objectives [4]. The former has the objective of minimizing the total used power while the user data rate requirements of each user at each Time Transmission Interval (TTI) have to be fulfilled. The latter problem aims at maximizing the minimum user allocated data rate at each TTI. The MA and RA algorithms aim at solving RRA problems in OFDMA systems based only on the current system conditions. They do not take into account e.g. the effect of past allocations when allocating resources to the users at the current TTI.

Weighted Multi-Carrier Proportional Fair (WMPF) scheduling algorithm is a generalization of Weighted Proportional Fair (WPF) algorithm to the multi-carrier case. WMPF scheduler is a modification of Multi-Carrier Proportional Fair (MPF) scheduler to deal with different rate requirements, and is e.g. described by Hoon Kim, Keunyoung Kim, Youngnam Han and Sangboh Yun, "A Proportional Fair Scheduling for Multicarrier Transmission Schemes," IEEE Communications Letters, v.9, n.3, pp. 210-212, 2005 [5]. WMPF consists of a scheduling algorithm that gives opportunity of transmission in a given subcarrier to the terminal that has the greatest priority. The WMPF priority function of a terminal in a given subcarrier takes into account the current channel condition, the user average data rate requirement and the average data rate perceived by the user due to the past allocations. The WMPF scheduling algorithm does thereby take into account the effect of past allocation in the current scheduling decision. This is done by the average data rate perceived by the user due to the past allocations in the denominator of WMPF priority function. However, this algorithm may in certain situation operate to satisfy a few users while sacrificing a large number of other users.

A general problem with prior-art solutions is that no or little concern is taken to the actual total user satisfaction.

SUMMARY

The technology disclosed herein provides scheduling and RRA algorithms that track user Quality of Service so as to increase and preferably maximize the number of satisfied users in the system.

A first aspect of the technology disclosed herein concerns a method for resource allocation in a wireless communication system, having a set of connected terminals, comprises allocating transmission resources and assigning transmission resources. The allocating of transmission resources in turn comprises estimating, for each of the connected terminals, of a requirement value representing an amount of required transmission resources for satisfying a minimum quality of service during a next transmission time interval for respective connected terminal. Connected terminals having the requirement value lower than or equal to zero are preferably removed from the set into a subset of satisfied terminals. An allocation subset is generated by including unsatisfied connected terminals from the set of connected terminals so that the sum of the requirement values of the included connected terminals of the allocation subset is not higher than the available transmission resources in the next transmission time interval. The generation of the allocation subset is performed by including connected terminals in an order according to the respective requirement values, starting with the lowest requirement value. The assigning of transmission resources is thereafter performed by assigning transmission resources of the next transmission time interval to connected terminals of the allocation subset.

According to a second aspect, an arrangement for resource allocation in a wireless communication system, having a set of connected terminals, comprises allocating means, arranged for allocating transmission resources, and assigning means for assigning transmission resources. The assigning means is connected to the allocating means. The allocating means in turn comprises means for estimating, for each of the connected terminals, a requirement value representing an amount of required transmission resources for satisfying a minimum quality of service during a next transmission time interval for respective said connected terminal. The allocating means preferably further comprises means for removing connected terminals having the requirement value lower than or equal to zero from the set into a subset of satisfied terminals. The means for removing is connected to the means for estimating. The allocating means also comprises means for generating an allocation subset by including unsatisfied connected terminals from the set of connected terminals so that the sum of the requirement values of the included connected terminals of the allocation subset is not higher than the available transmission resources in said next transmission time interval. The means for allocating is connected to the means for estimating. The means for generating an allocation subset is further arranged for including connected terminals in an order according to the respective requirement values, starting with the lowest requirement value. The assigning means is thereby arranged for assigning transmission resources of the next transmission time interval to connected terminals of the allocation subset.

According to a third aspect, a node, for use in a wireless communication system, comprises an arrangement according to the second aspect.

According to a fourth aspect, a wireless communication system comprises an arrangement according to the second aspect and/or a node according to the third aspect.

In other words, to achieve the objects it is necessary to pre-empty users that demand a large amount of resources to be satisfied, by users that requires a small quantity of resources to become satisfied.

One advantage with the technology disclosed herein is that the number of satisfied users increases, resulting in a lower noticibility of limited resources to the users. The technology disclosed herein also increases the number of users satisfactorily served in the cell in an OFDMA-based wireless system. The technology disclosed herein also provides a good trade-off between user satisfaction and system spectral efficiency. Furthermore, the technology disclosed herein is suitable for implementation in practical systems due to its low computational time, constant transmission power and link quality control functions. The technology disclosed herein has moreover the capability of keeping the system stable with respect to changes in the system load, preventing that new users impact on the Quality of Service of current users.

BRIEF DESCRIPTION OF THE DRAWINGS

The technology disclosed herein, together with further objects and advantages thereof, may best be understood by making reference to the following description taken together with the accompanying drawings, in which.

DETAILED DESCRIPTION

Figure 1A:
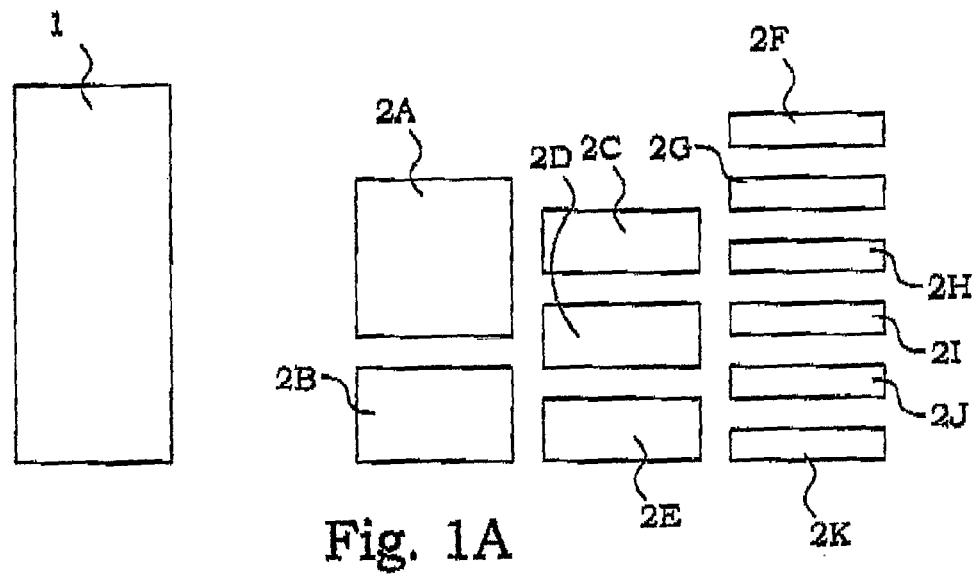
FIG. 1A is a schematic illustration of available transmission resources and connected terminal required resources to be satisfied.

In the drawings, corresponding reference numbers are used for similar or corresponding parts.

In FIG. 1A, amounts of available transmission resources 1 in a communication system is illustrated together with amounts of transmission resources 2A-K, necessary in a next TTI (Transmission Time Interval) to make a corresponding user satisfied with the provided service. As can be seen, the available transmission resources 1 are too small to satisfy all users, and a certain election has to be made.

Figure 1B:
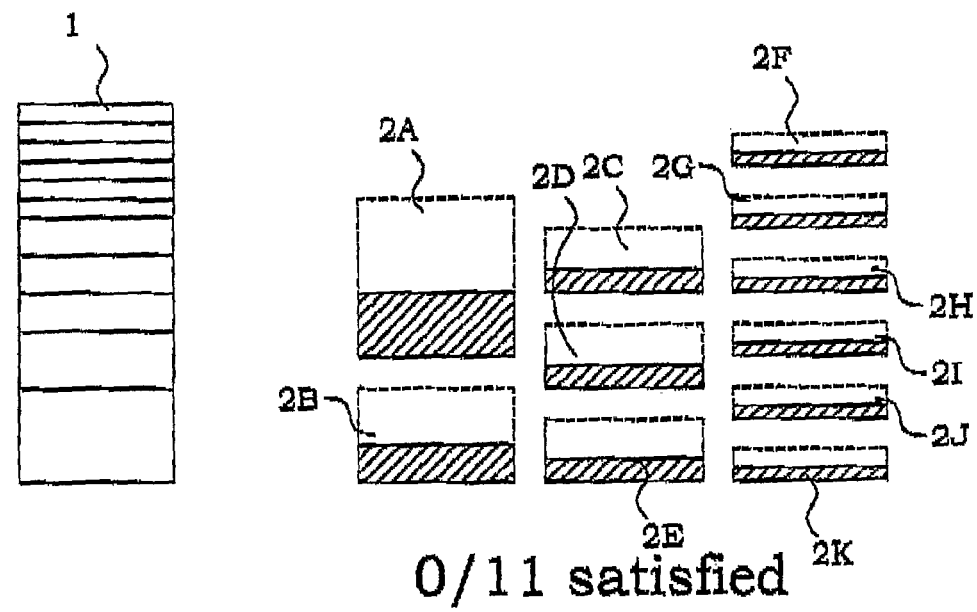
FIG. 1B is a schematic illustration of available transmission resources proportionally distributed to connected terminals.

One approach is to assign transmission resources in proportion to the requested amount. In other words, if a total requested amount of transmission resources for satisfying all users is 20% higher than the available amount of transmission resources, then each user is assigned an amount of transmission resources being a ratio 1/1.2 of the requested transmission resources. In FIG. 1A, the requested transmission resources are ⅔ higher than the available ones. In FIG. 1B, a proportional assignment of transmission resources according to prior art is illustrated giving each user ⅗ of the requested transmission resources. A result becomes than none of the users becomes satisfied.

Figure 1C:
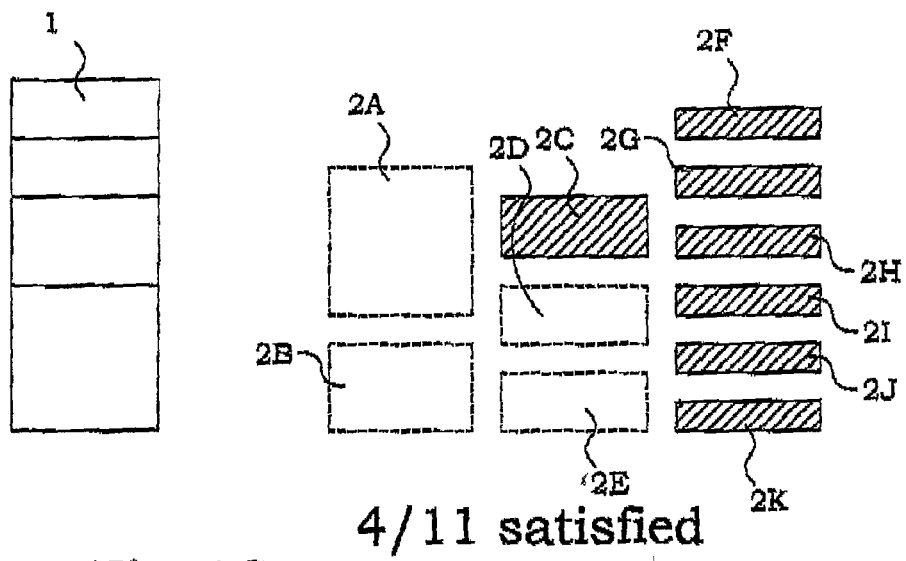
FIG. 1C is a schematic illustration of available transmission resources randomly distributed to connected terminals.

In an alternative prior art approach, assignment is made in a random manner. Different actual scenarios may then be achieved for different transmission time intervals. One possible scenario is illustrated in FIG. 1C. Here, four of the users are sharing the available transmission resources, leaving seven unsatisfied. This means that only 36% of the users are satisfied. In a random assignment scheme, the actual satisfaction level will vary with an average level around 60%, but may in a worst scenario be as illustrated.

Figure 1D:
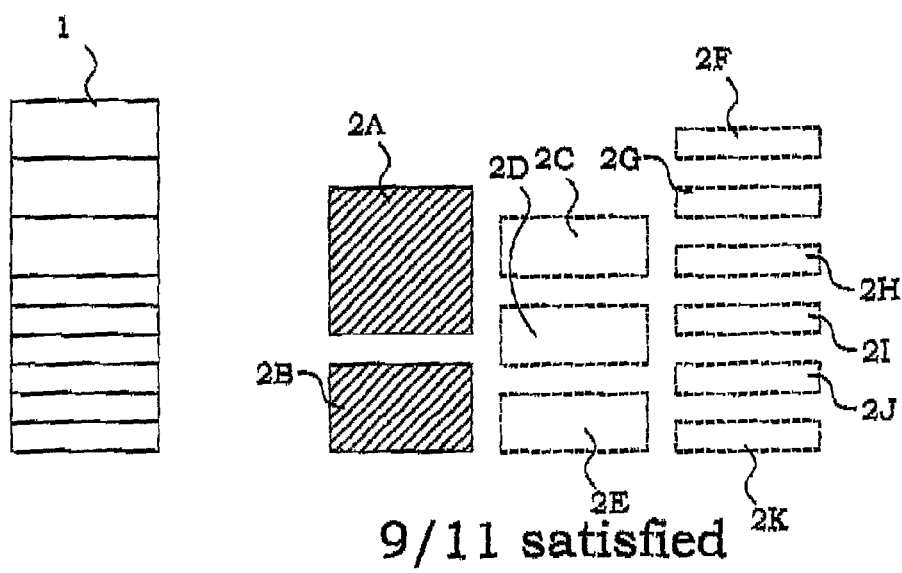
FIG. 1D is a schematic illustration of available transmission resources distributed to connected terminals according to an embodiment of the technology disclosed herein.

In an embodiment of a resource allocation scheme according to the technology disclosed herein, the situation instead becomes as illustrated in FIG. 1D. Despite the high (67%) undercapacity the resource allocation manages to keep nine of the eleven users satisfied, i.e. 82% of the users are anyway provided by the requested quality of Service.

The means for achieving such resource allocations are described in detail here below.

In a typical case, "transmission resource units", described in the present disclosure corresponds to subcarriers. However, in other embodiments, the transmission resource units may also be composed in other ways. It may e.g. be a sub-channel in OFDMA, i.e. a block of subcarriers. It may also be a code or a block of codes, as in CDMA (Code Division Multiple Access). In the present disclosure, the term "transmission resource units" are used in most places. In the cases "subcarriers" are used, it is either in connection with a certain specific example or used as an exemplifying embodiment.

Likewise, a "requirement value" is discussed. In a general meaning, the requirement value represents an amount of required transmission resources for satisfying a minimum quality of service during a next transmission time interval for a connected terminal. In a typical case, the requirement value is expressed as a number of transmission resource units, or even more typical a number of subcarriers. However, also other values that basically represent the same requirements but expressed in different terms can be used in the proposed algorithms.

The problem to be solved, at least in a suboptimal way, is to maximize the number of satisfied users in the system. A mathematical problem formulation giving rise to an algorithm to use follows here:

$$\underset{X[k]}{\text{Max}} \sum_{\forall j} U_j[k] \qquad (1)$$

subject to $$\sum_{\forall n} x_{j,n}[k] \leq 1, \forall n,$$

where X[k] is an assignment matrix with elements $x_{j,n}[k]$ that assumes 1 when the transmission resource unit n is assigned to the terminal j at TTI k and 0 otherwise. Also, $U_j[k]$ is given by:

$$U_j[k] = \begin{cases} 1 & \text{if } \bar{r}_j[k] \geq R_j \\ 0 & \text{otherwise} \end{cases} \qquad (2)$$

where $\bar{r}_j[k]$ is the average data rate at TTI k of terminal j and $R_j$ is the average data rate requirement of terminal j.

These functionalities are typically located in access points of the communication system and allocate resources to terminals in the downlink direction. This will be illustrated more further below.

In an embodiment of the technology disclosed herein an algorithm is utilized. The algorithm is a general framework to maximize the number of satisfied users in an OFDMA system with Non-Real-Time (NRT) services. Any particular service has a user satisfaction performance metric that is used to determine if a given user utilizing this service is satisfied or not. The quality of service is thus related to a performance metric, preferably session throughput or frame erasure rate. In the present example, it is assumed that the NRT services has the user average data rate as the satisfaction performance metric, i.e., users are considered satisfied if their average data rate is greater than or equal to their average data rate requirement as shown in (2).

The present embodiment of a method for resource allocation requires one Link Quality Indicator (LQI) per transmission resource unit as well as an estimate of the average data rate experienced by each user. It is also assumed that the OFDMA wireless system in focus has a Link Quality Control (LQC) function able to map LQI into a set of data rates implemented in the physical layer. The method uses fixed power per transmission resource unit, i.e. the transmission resource units have equal power allocation.

Figure 2:
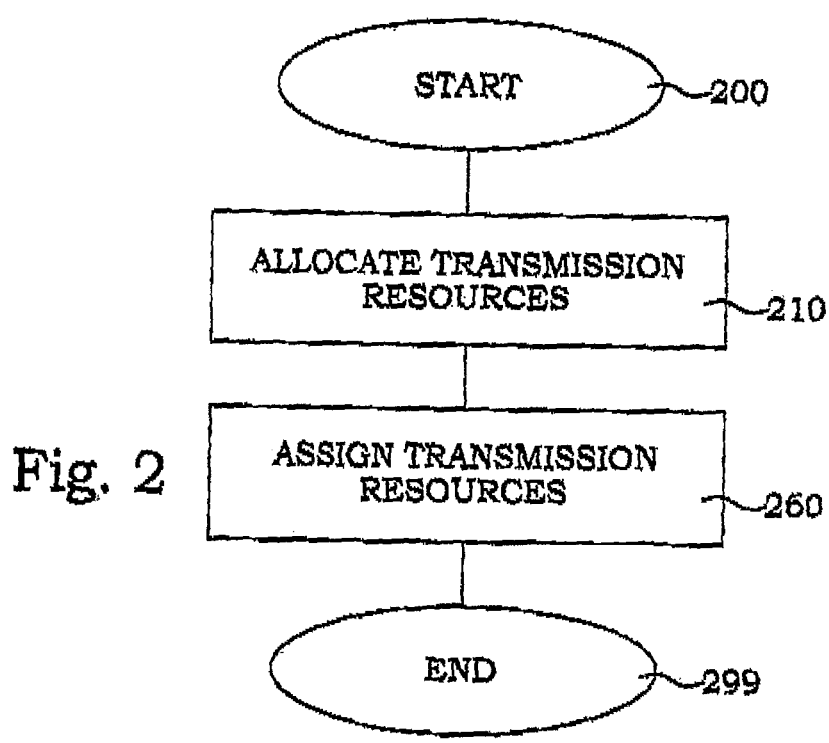
FIG. 2 is a flow diagram of steps of an embodiment of a method according to the technology disclosed herein.

FIG. 2 illustrates a flow diagram of an embodiment of a method for resource allocation. The method for resource allocation in a wireless communication system having a set of connected terminals begins in step 200. The present embodiment of the method is divided into two main parts: a resource allocation step 210 and a resource assignment step 260, as indicated in FIG. 2. The method ends in step 299.

Figure 3:
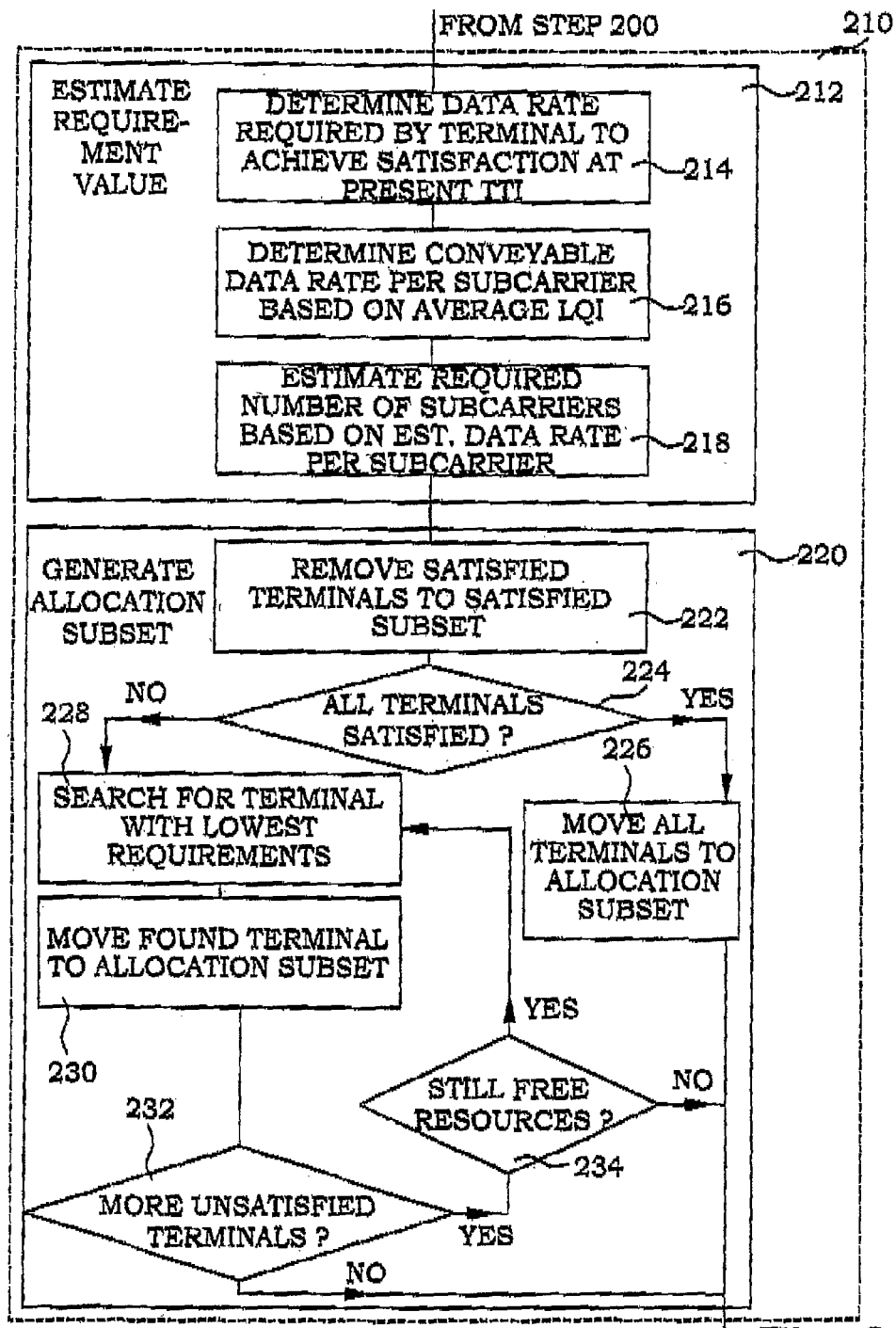
FIG. 3 is a flow diagram of steps of an embodiment of an allocating step of FIG. 2.

An embodiment of the resource allocation step is illustrated in more detail in FIG. 3. In step 212, for each of the connected terminals, a requirement value representing an amount of required transmission resources for satisfying a minimum quality of service during a next transmission time interval is estimated, for respective connected terminal. Preferably, a target data rate is estimated and based on the estimated target data rate and an available channel quality of the connected terminal in question the estimated requirement value is calculated. Preferably, the estimated requirement value is an estimated target number of transmission resource units for providing the target data rate, which in turn is required for satisfying a minimum quality of service. This is achieved in the present embodiment by step 212 comprising three part steps. In a first part step 214, a data rate required by each terminal to achieve its satisfaction at the next TTI is determined. In step 216, a conveyable data rate per subcarrier is estimated based on the terminal average LQI. In step 218, the required number of subcarriers is estimated based on the estimated data rate per subcarrier.

In other words, a general way, the requirement value estimation step tries to estimate the amount of resources that must be assigned in the current TTI so as to the users achieve satisfaction. The users are separated into two subsets; the subset with satisfied and unsatisfied users. The former subset comprises the users that are already satisfied at the current TTI and do not need be scheduled at this moment. The latter subset is composed by users that have to be scheduled in this TTI in order to achieve satisfaction. The composition of each subset is done based on the estimation of the number of transmission resource units that would have to be allocated to each user in order to these users become satisfied. In this process, a mapping of the key service performance metric related to the user satisfaction in the required amount of resources to satisfy a given user should preferably be done. This estimation utilizes preferably the average LQI of each user in all transmission resource units and the average allocated data rate to the users until the current TTI. The equations follow below.

$$\Delta r_j[k] = R_j \cdot k - \bar{r}_j[k-1] \cdot (k-1) \qquad (3)$$

$$\overline{LQI}_j[k] = (1/N) \cdot \sum_{n=1}^{N} LQI_{j,n}[k] \qquad (4)$$

$$m_j[k] = \left\lceil \frac{\Delta r_j[k]}{F(\overline{LQI}_j[k])} \right\rceil \qquad (5)$$

Basically, equation (3) refers to step 214, equation (4) refers to step 216 and equation (5) refers to step 218. In equations from (3) to (5), $\Delta r_j[k]$ is an estimate of the data rate that must be allocated to terminal j so it becomes satisfied at TTI k, $R_j$ is the average minimum data rate requirement of terminal j and $\bar{r}_j[k-1]$ is the average allocated data rate to terminal j until TTI k−1. Note that in the first TTI $\bar{r}_j[1]$ is equal to 0 for all terminals. Also, $LQI_{j,n}[k]$ is the link quality indicator of terminal j in transmission resource unit n at TTI k; $\overline{LQI}_j[k]$ is the average link quality indicator of terminal j among all transmission resource units at TTI k; and N is the number of available transmission resource units. Finally, $m_j[k]$ is the estimated number of transmission resource units that must be allocated to terminal j becomes satisfied at TTI k, F(•) is a mapping function from LQI to data rate, and [u] is the first integer greater than or equal to u.

In step 220, an allocation subset is generated by including unsatisfied connected terminals from the set of connected terminals. This inclusion is made so that the sum of the requirement values of the included connected terminals of the allocation subset is not higher than the available transmission resources in the next transmission time interval. Furthermore the including of connected terminals is performed in an order according to the respective requirement values, starting with the lowest requirement value larger than zero.

In this particular embodiment, the step 220 in turn comprises a number of part steps. In step 222, connected terminals having the requirement value lower than or equal to zero are removed from the set into a subset of already satisfied connected terminals. The unsatisfied connected terminals are thereby comprised in the remaining set of connected terminals. In step 224, it is checked whether or not the remaining set of connected terminals is empty. If the remaining set of connected terminals is empty, the process continues to step 226, where all connected terminals are moved from the subset of satisfied connected terminals to the allocation subset. In such a situation, where all users are satisfied, assignment can be performed in any order, and the concept of satisfying all users becomes trivial. However, if in step 224, it is concluded that there are unsatisfied connected terminals, the process continues to step 228, where a search for the connected terminal within the remaining set of connected terminals that requires the lowest number of subcarriers to become satisfied. The found connected terminal is moved to the allocation subset in step 230. In step 232, it is determined whether or not there are unsatisfied connected terminals left in the remaining set. If not, the generation of the allocation subset is completed. If there are remaining unsatisfied connected terminals in the remaining set, the process continues to step 234, where it is determined whether the sum of the required number of subcarriers of the connected terminals in the allocation subset is larger than the number of subcarriers available in the cell. If there is remaining capacity, the process returns to step 228, otherwise the generation of the allocation subset is completed.

In other words, the users within the unsatisfied subset that will have transmission opportunity are determined and will compose the allocation subset. These users are chosen in such a way that the ones that require less transmission resources to be satisfied are elected first. The users are chosen until their total estimated number of required transmission resource units is higher than the number of available transmission resource units.

In the embodiment above, a separate step 222 separating unsatisfied and satisfied terminals is presented. However, this separating action can also be integrated in the actual step of finding a next terminal to include in the allocation subset. By changing the search condition for next terminal to only consider terminals with a number of subcarriers to become satisfied that is larger than zero, the satisfied terminals may remain in the remaining set of terminals without being elected. However, as seen further below, a division into satisfied and unsatisfied may preferably be used during the resource assigning step and a separation is therefore preferably already performed during the resources allocation step.

The result from the resource allocation step is an allocation subset of connected terminals that are to be prioritized when making the actual resource assignment. The resource assignment step is then preferably performed dependent on available link quality of respective connected terminals of the allocation subset.

Figure 4:
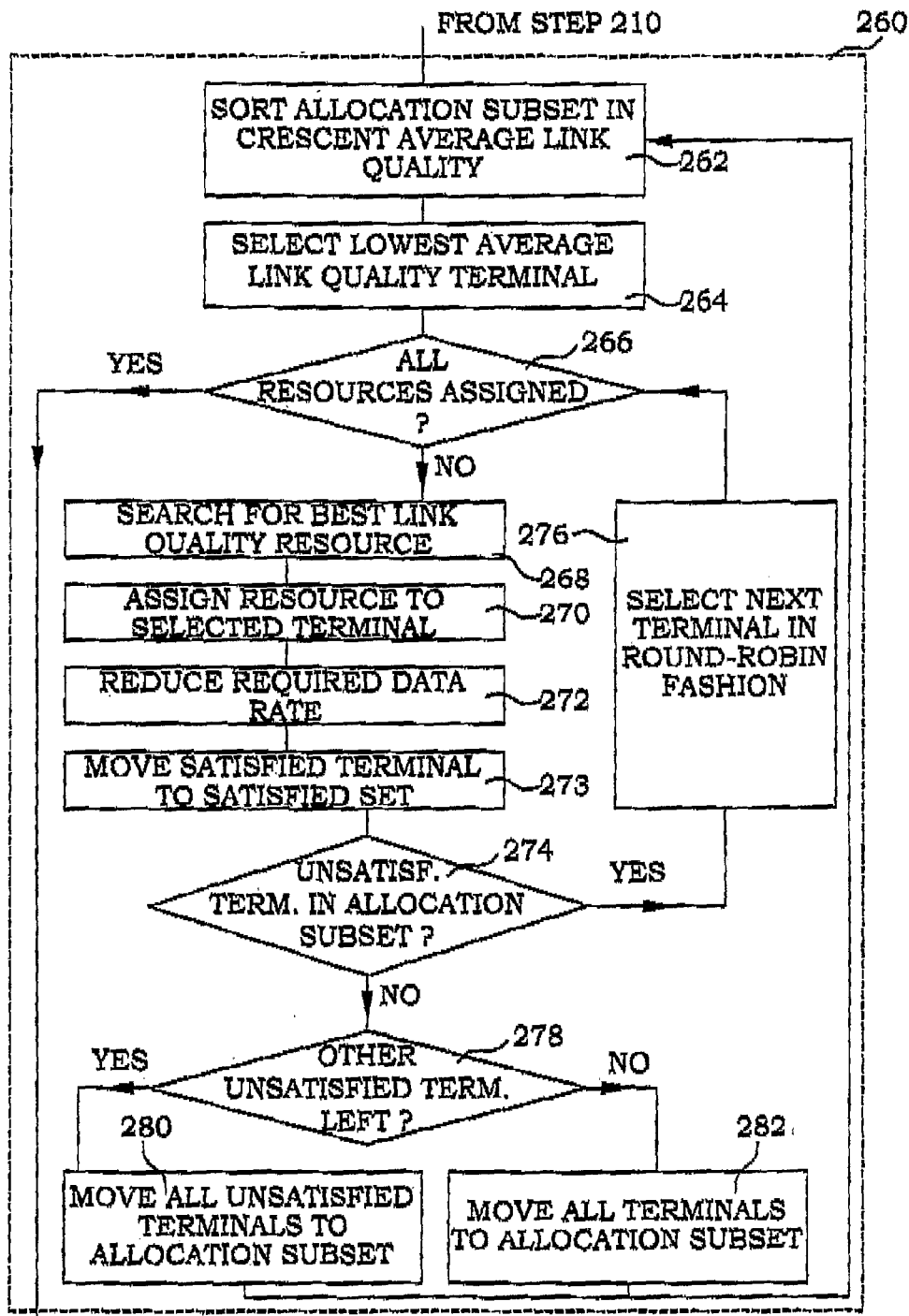
FIG. 4 is a flow diagram of steps of an embodiment of an assigning step of FIG. 2.

An embodiment of a resource assignment step is illustrated in more detail in FIG. 4. In step 262, the connected terminals of the allocation subset are sorted in an order of crescent average link quality. The first connected terminal thus has the lowest average link quality. In step 264, this first connected terminal of the sorted allocation subset having the lowest average link quality is selected. In step 266, it is checked whether or not all transmission resource units of a next transmission time interval are assigned. If that is the case, the process continues to step 299, otherwise the process continues to step 268. In step 268, an available transmission resource unit, typically a subcarrier, with the best link quality for the selected connected terminal is searched. This available transmission resource unit is then in step 270 assigned to the selected connected terminal. In step 272, the required data rate of the selected connected terminal is reduced by an amount corresponding to what is offered by the assigned transmission resource unit. Preferably, when the selected connected terminal gets a remaining requested data rate equal to or lower than zero, the selected connected terminal is moved to the subset of satisfied terminals, as indicated by step 273.

In step 274, it is checked whether or not the allocation subset has any connected terminals with a requirement value larger than zero. If there are unsatisfied connected terminals in the allocation set, the procedure continues to step 276, in which a next connected terminal of the sorted allocation subset is selected in a round-robin fashion. In other words, the choice of the next connected terminal is based on the previous sorting and, if the current connected terminal is the last of the sorted allocation subset, the next connected terminal will be the first of the sorted allocation subset. The procedure then returns to step 266. The steps 268, 270, 272 and 276 are thereby repeated until all transmission resource units are assigned or there are no unsatisfied connected terminals left in the sorted allocation subset.

If, in step 274, it is concluded that there are no unsatisfied connected terminals are present in the sorted allocation subset, the procedure of this embodiment continues to step 278. If satisfied connected terminals are kept within the sorted allocation subset, they are now preferably moved to the subset of satisfied connected terminals. In step 278, it is determined whether there are any unsatisfied connected terminals that originally were not included in the allocation subset. In such a case, the process continues to step 280, where all unsatisfied connected terminals are moved into the allocation subset. In other words, if transmission resources of the next transmission time interval still are available after assigning of transmission resources to all terminals in the allocation subset, all unsatisfied connected terminals are moved to the allocation subset. This gives a new allocation subset comprising unsatisfied terminals not earlier included in the allocation subset. The procedure then continues to step 262, whereby assignment continues according to the above described procedures.

If it is concluded in step 278 that no unsatisfied connected terminals are remaining, e.g. after having passed step 280 in an earlier stage, the process continues to step 282. At this stage, all connected terminals are satisfied, and remaining available transmission resource units can be assigned to any of the connected terminals. In the present embodiment, all terminals (now being comprised in the subset of satisfied terminals) are moved into the allocation subset in step 282 and the process returns to step 262. In other words, all connected terminals, e.g. from the subset of satisfied terminals, are moved into the allocation subset, and the assigning of transmission resources is repeated.

In this part, the matching between transmission resource units and terminals is thus performed. Before starting the assignment, the users in the allocation subset are sorted in a crescent order by their average LQI($\overline{LQI}_j[k]$) so as to give a priority to the users with poorer channel conditions. The terminals in the allocation subset choose their best transmission resource units in a round robin fashion until the data rate necessary to satisfy this user in the present TTI ($\Delta r_j[k]$) calculated in the resource allocation step) is fulfilled. Note that, in case the users of allocation subset achieve satisfaction (leaving the allocation subset empty) and there are still available resources, the remaining users in the unsatisfied subset (if there are any) are in the latter part of FIG. 4 put in the allocation subset to demand resources at the current TTI. Also, if the unsatisfied subset is empty, users in the satisfied subset are put in the allocation subset to demand resources at the current TTI.

The embodiment of the method here above was described within an OFDMA wireless communication system. This is the system that is believed to benefit the most from the technology disclosed herein. However, the basic principles are advantageously applicable also to other systems.

The technology disclosed herein is thus a radio resource allocation method that divides the terminals into subsets based on a satisfaction metric. The algorithm maximizes the system satisfaction based on the satisfaction metric by first allocating only the resources that each terminal needs. The presented algorithm thus maximizes the user satisfaction that is directly linked with system capacity. In a preferred embodiment, the present method still allows good spectral efficiency because each terminal preferably chooses its best transmission resource unit available in the assignment step. By dividing the users into subsets, e.g. satisfied and unsatisfied, and giving priority to the unsatisfied users set, the technology disclosed herein avoids the allocation of transmission resource units to users that already reached their satisfaction metric while there are still unsatisfied terminals.

When a new terminal connects to the system, it tries to reach its QoS requirements in the current TTI. This will give a relative priority to this new terminal. This user will thus be scheduled before users that have a really poor channel conditions which have to compensate the lack of transmission on the previous TTIs. However, this new user will be scheduled after a user which is close to satisfaction. This behaviour of giving the transmission resource units first to the most easily satisfiable terminals gives stability to the system with respect to load changes and avoids that the connection of new terminals in the system degrades the QoS of the terminals that are already being served.

The allocation step has the function of determine the terminals which will be first served. However, in case these terminals achieve their requirements before the system resources are completely used, the terminals out of the allocation subset can still be served. Although these resources may not be sufficient to take those unsatisfied terminals to satisfaction, this makes it easier to satisfy these terminals in the next TTIs.

The sorting the terminals in the allocation subset, i.e. the first step of the assignment part of the embodiment above, has the function of avoiding that the few good transmission resource units of a poor channel quality terminal are taken by a terminal with plenty of good transmission resource units. Also this acts as a kind of prioritizing.

The technology disclosed herein has low computation complexity, as the majority of the operations are set manipulation. Also, the mapping between LQI and data rate using LQC is done only when a transmission resource unit is already assigned to a terminal. The preferred use of constant power allocation results in a simpler hardware implementation. In addition, a constant power per transmission resource unit provides a more stable, and easier to track inter-cell interference in case of a system-wide application of the proposed method.

Figure 5:
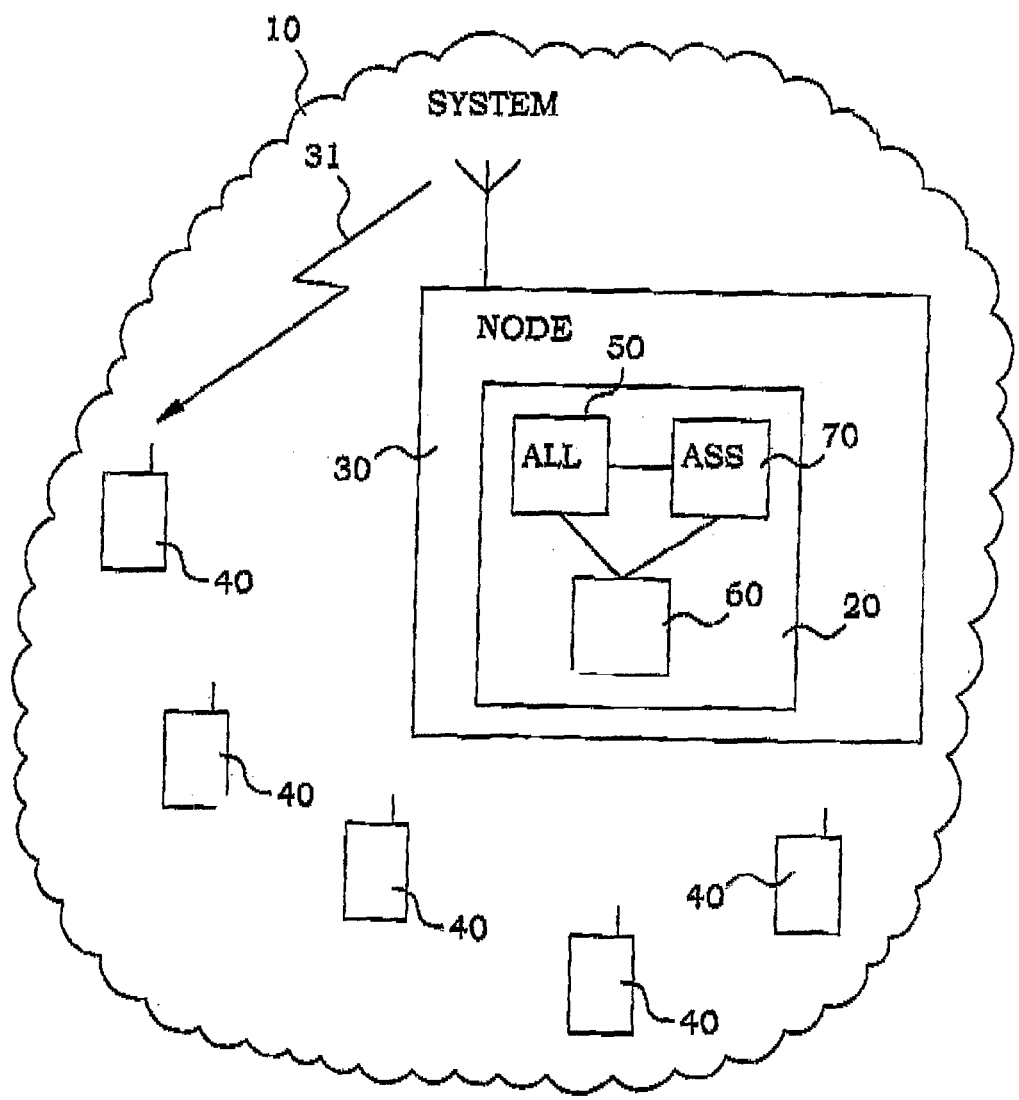
FIG. 5 is a block diagram of an embodiment of a wireless communication system according to the technology disclosed herein.

FIG. 5 illustrates a wireless communication system 10 having an embodiment of an arrangement 20 according to the technology disclosed herein. In the present particular embodiment, the wireless communication system 10 is intended to be an OFDMA system, where all transmission resource units have a constant power allocation. In the present embodiment, the arrangement 20 is situated within one node 30 of the wireless communication system 10. As mentioned above, such node 30 is typically an access point of the wireless communication system 10 and allocates resources to a set of connected terminals 40 in the downlink direction 31. However, in alternative embodiments, the arrangement may also be a distributed arrangement involving more than one unit or node. The operations of the arrangement are typically performed by software provided in processors. The different means of the arrangement 20 may thereby be comprised in one or several connected processors. In the embodiment of FIG. 5, the arrangement 20 comprises an allocating means 50 and an assigning means 70, connected to the allocating means 50. The allocating means 50 and the assigning means 70 operates towards a set 60 of connected terminals, a representation of which preferably is present within the arrangement 20.

Figure 6:
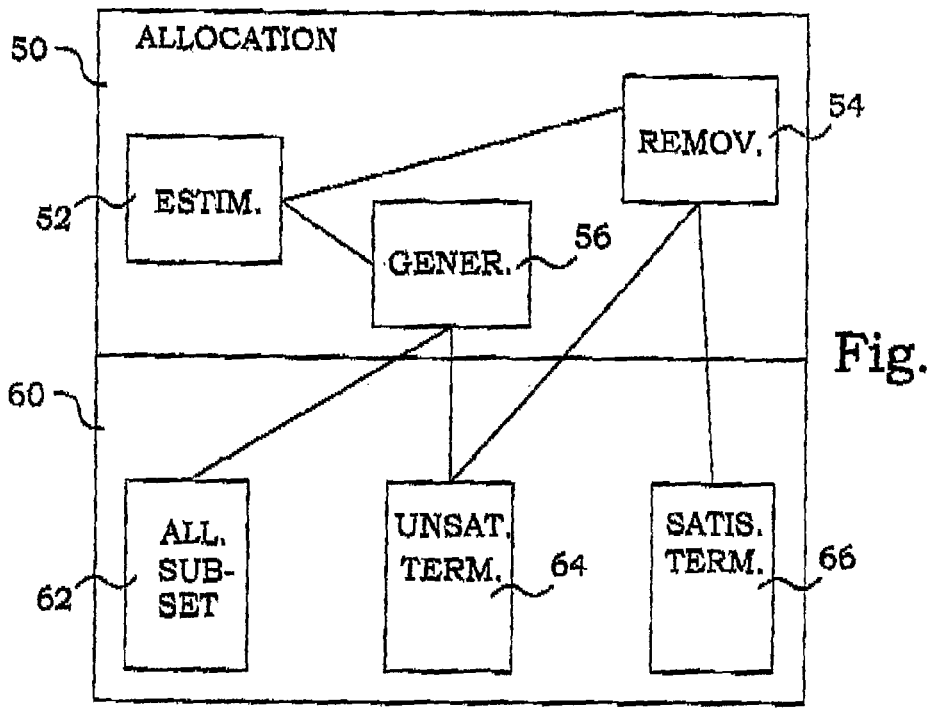
FIG. 6 is a block diagram of an embodiment of an allocating means of FIG. 5.

FIG. 6 illustrates a block scheme of an embodiment of an allocating means 50 usable in the technology disclosed herein and a representation of the set 60 of connected terminals. The allocating means 50 is arranged for allocating transmission resources to the connected terminals. The allocating means 50 comprises a means for estimating 52. The means for estimating 52 estimates a requirement value for each of the connected terminals. The requirement value represents an amount of required transmission resources to satisfy a minimum quality of service during a next transmission time interval for each respective connected terminal. The means for estimating 52 is in the present embodiment arranged for estimating of a target data rate and for calculating the estimated requirement value based on the estimated target data rate and an available channel quality of a respective connected terminal This is preferably performed as described further above. The estimated requirement value is preferably an estimated target number of transmission resource units.

Originally, in the present embodiment, all connected terminals are presumed to be comprised by a subset of unsatisfied terminals 64. In the present embodiment, the allocating means 50 further comprises means for removing 54 connected terminals having a requirement value lower than or equal to zero from the unsatisfied subset 64 into a subset of satisfied terminals 66. The means for removing 54 is connected to the means for estimating 52.

The allocating means 50 further comprises means for generating 56 an allocation subset 62. This is performed by including connected terminals from the set of connected terminals 60 so that the sum of the requirement values of the included connected terminals of the allocation subset 62 is not higher than the available transmission resources in the next transmission time interval. The means for generating 56 is connected to the means for estimating 52. The means for generating 56 an allocation subset 62 is further arranged for including connected terminals in an order according to the respective requirement values, starting with the less demanding requirement value.

Figure 7:
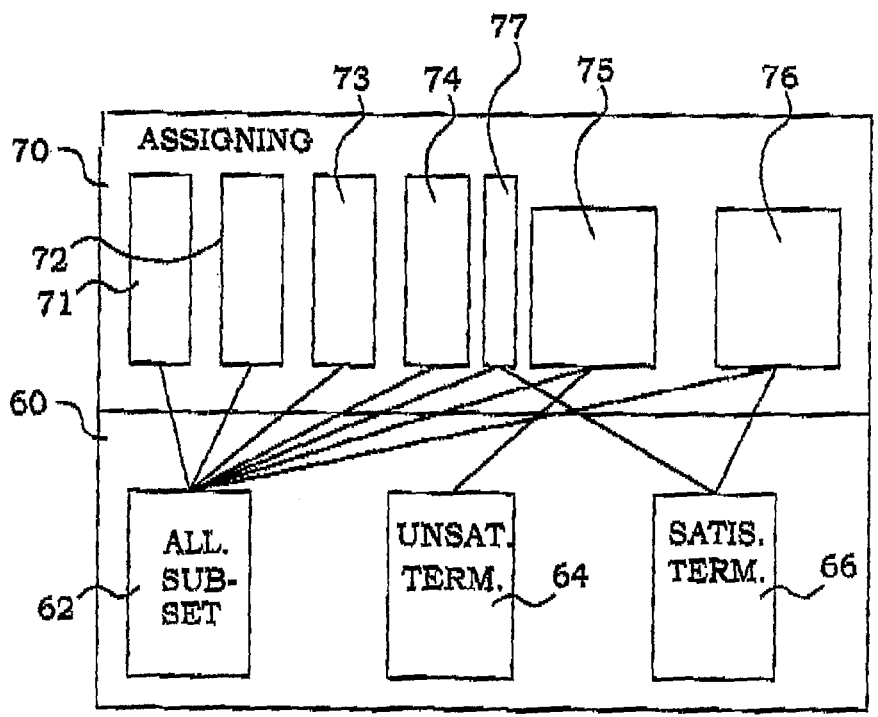
FIG. 7 is a block diagram of an embodiment of an assigning means of FIG. 5.

FIG. 7 illustrates a block scheme of an embodiment of an assigning means 70 usable in the technolopy disclosed herein and the representation of the set 60 of connected terminals. The assigning means 70 is arranged for assigning transmission resources of the next transmission time interval to connected terminals of the allocation subset. The assigning means 70 is further arranged for performing assigning dependent on available link qualities of the respective connected terminals of the allocation subset. In the present embodiment, the assigning means 70 comprises sorting means 71 the connected terminals of the allocation subset 62 in an order of crescent average link quality. The assigning means 70 also comprises selecting means 72. The selecting means 72 is arranged for originally selecting a connected terminal of the sorted allocation subset 62 having the lowest average link quality. The assigning means 70 further comprises means 73, arranged for assigning an available transmission resource unit of the transmission resources of the next transmission time interval to said selected connected terminal The assigned transmission resource unit is the one having a best link quality for the selected connected terminal of all still available transmission resource units. A means 74 is arranged for reducing the required data rate of the selected connected terminal by an amount corresponding to the assigned transmission resource unit. Preferably, connected terminals now being satisfied are moved to the subset of satisfied connected terminals 66, as performed by the means 77. The selecting means 72 is then further arranged for selecting a next connected terminal of the sorted allocation subset, in a round-robin fashion. The assigning means 70 is then further arranged for causing the means 71-74 to repeat their operations until all transmission resource units are assigned or no connected terminals remains in the sorted allocation subset.

In the present embodiment, the assigning means 70 further comprises a replacing means 75, which is arranged to be operable if transmission resources of the next transmission time interval still are available after the operation of the means 73, i.e. assignment of transmission resources. The replacing means 75 is arranged for moving all connected terminals from the remaining set of connected terminals, i.e. the subset of unsatisfied terminals 64, to the allocation subset 62. The operation of the replacing means 75 gives a replaced allocation subset 62 comprising unsatisfied terminals not earlier included in the allocation subset. The means 71-74 may then repeat their operations on the new allocation subset.

In the present embodiment, the assigning means 70 further comprises a moving means 76, which is arranged to be operable if transmission resources of the next transmission time interval still are available after the operation of the means 73, i.e. assignment of transmission resources, to a replaced allocation subset caused by the replacing means 75. The moving means 76 is arranged moving all satisfied connected terminals to the allocation subset, whereafter the operations of means 71-74 can continue once more.

Simulations according to the ideas of the technology disclosed herein have been performed. Results are presented in the following. The main parameters used in the simulations are noted in Table 1.

Figure 8:
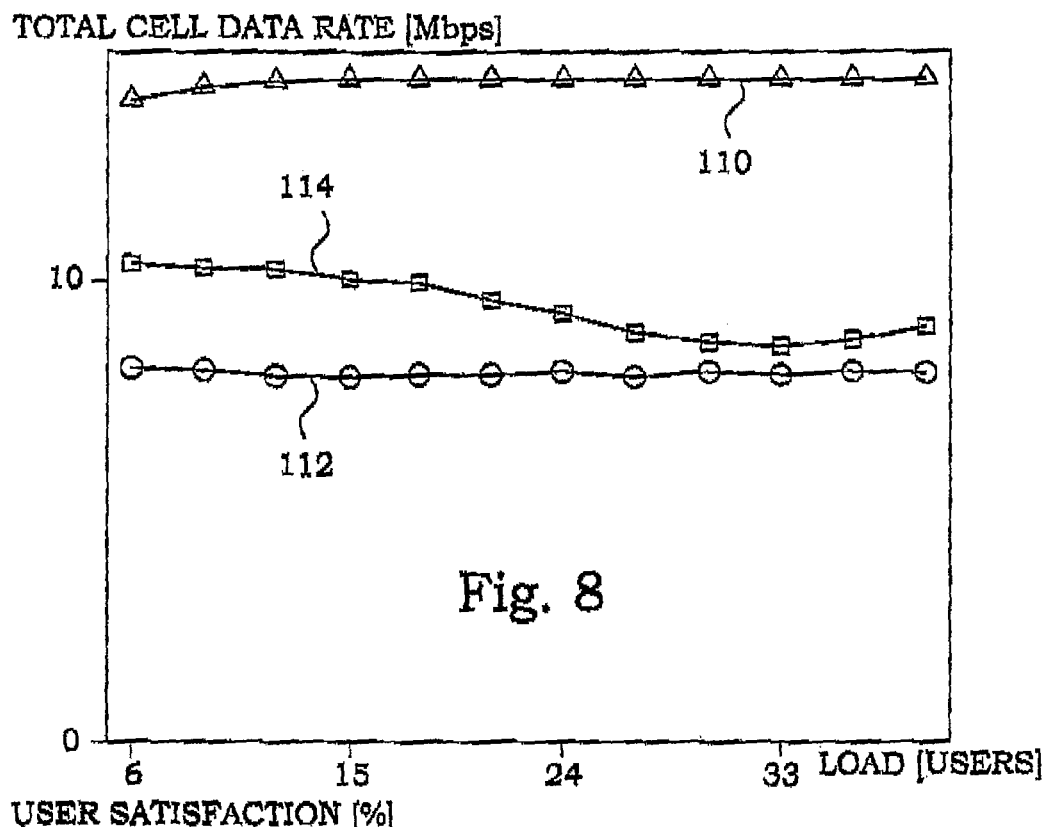
FIG. 8 is diagram of simulation results of total cell data rate for an equal average data rate requirement scenario.
Figure 9:
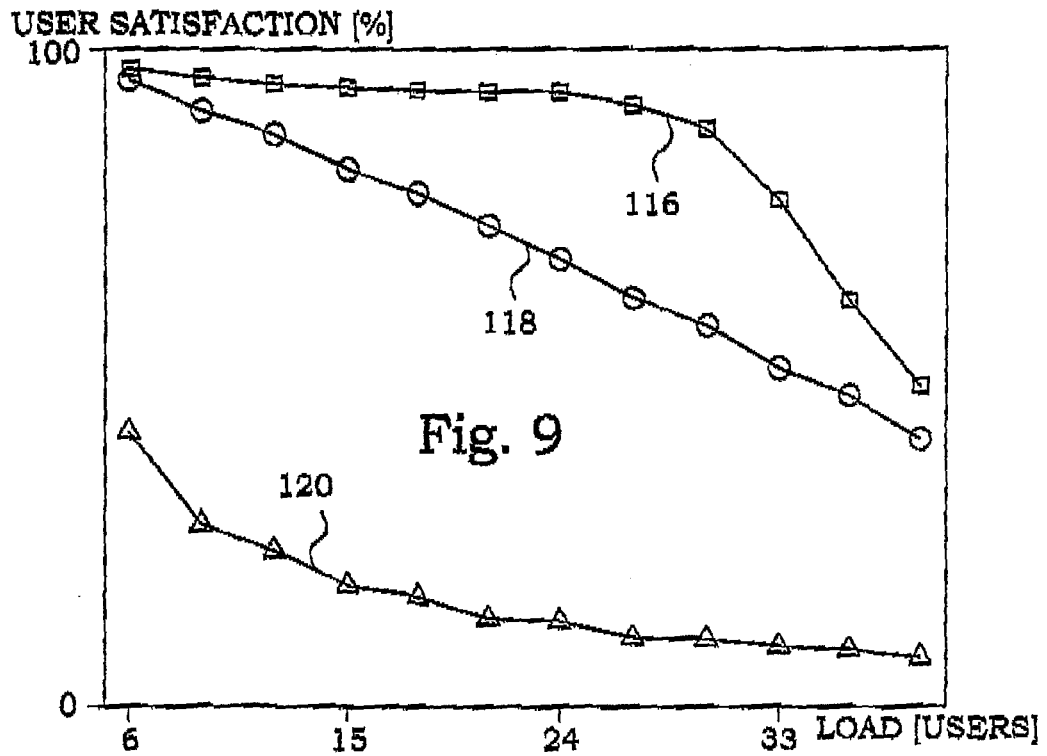
FIG. 9 is diagram of simulation results of user satisfaction for an equal average data rate requirement scenario.

FIG. 8 illustrates total cell data rate for an equal average data rate requirement scenario. Curve 110 represents results from an RM algorithm, curve 114 represents results from an algorithm according to the technology disclosed herein and curve 112 represents results from a WMPF algorithm. FIG. 9 illustrates user satisfaction for an equal average data rate requirement scenario. Curve 116 represents results from an algorithm according to the technology disclosed herein, curve 118 represents results from a WMPF algorithm and

TABLE 1

Simulation parameters.

Figure 10:
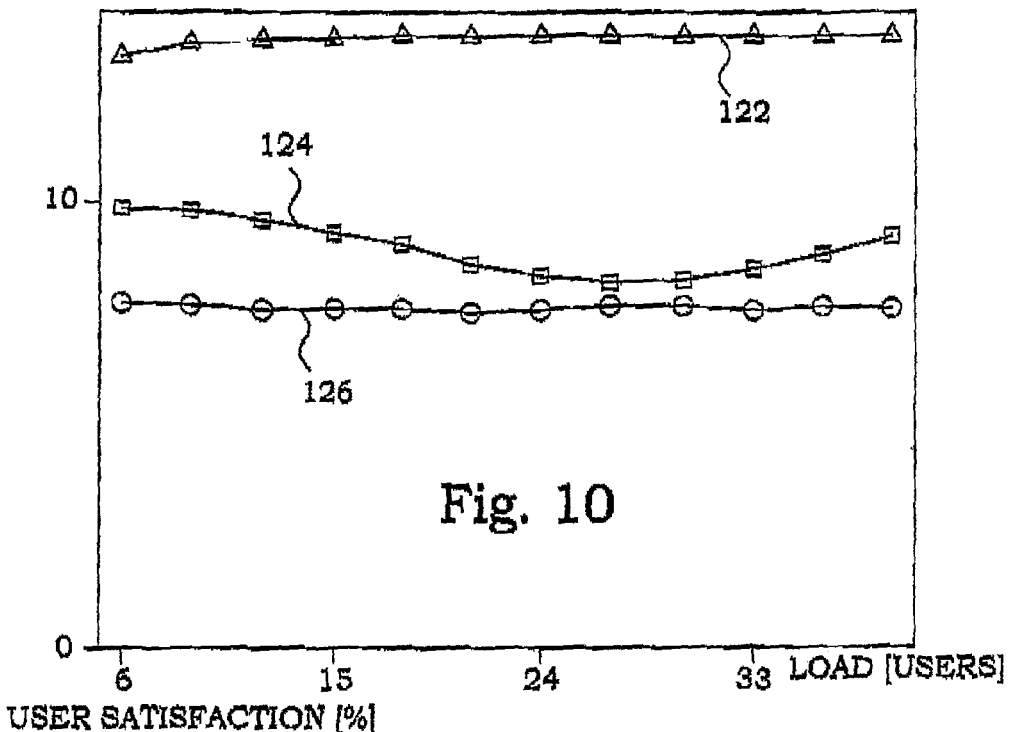
FIG. 10 is diagram of simulation results of total cell data rate for a different average data rate requirement scenario.
Figure 11:
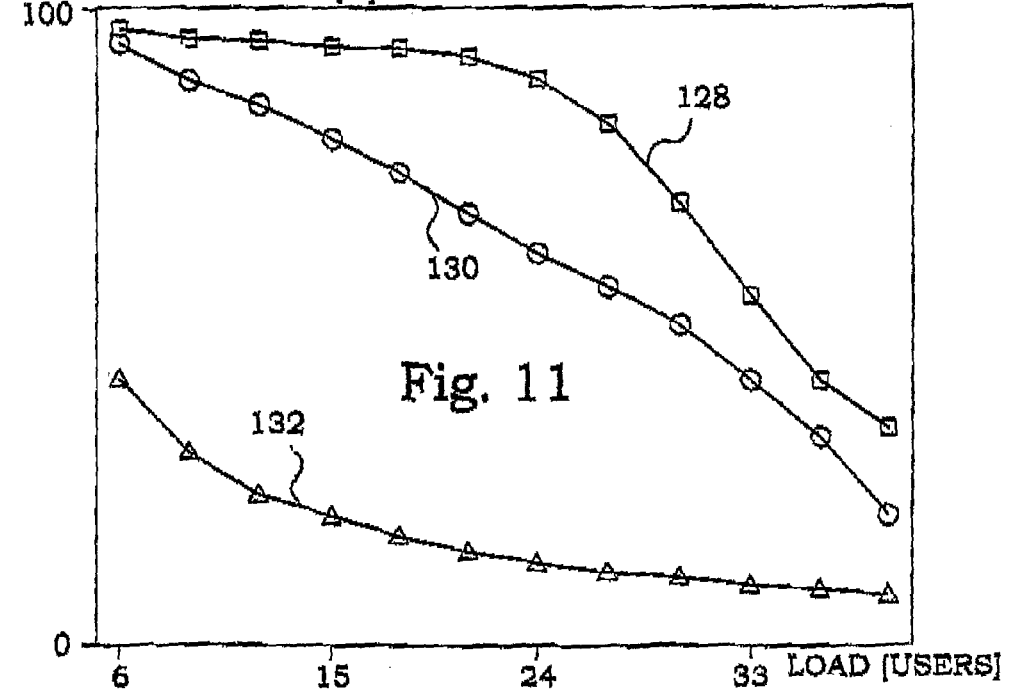
FIG. 11 is diagram of simulation results of user satisfaction for a different average data rate requirement scenario.

| Parameter | Value |
|---|---|
| Central operating frequency | 2 GHz |
| Number of subcarriers in the cell | 150 |
| Bandwidth per subcarrier | 15 kHz |
| Path loss | L [dB] at distance d [km] is calculated by L = 128.1 + 37.6 · log10(d). |
| Shadowing | Lognormal with standard deviation 8 dB |
| Fast fading | 3GPP Typical Urban (TU) model |
| Noise power per subcarrier | −123.24 dBm |
| Total base station power | 20 W |
| Cell radius | 1 km |
| TTI | 0.5 ms |
| Average data rate requirement for the equal data rate requirement scenario | 256 kbps |
| Average data rate requirement for the different data rate requirement scenario | 128 kbps, 256 kbps and 512 kbps |
| Time constant used in the exponential filter in the WMPF scheduler | 50 |
| User distribution | The users are static and uniformly distributed in the cell coverage area. |
| The minimum distance between the users and the cell antenna | 10 m | curve 120 represents results from an RM algorithm. FIG. 10 illustrates total cell data rate for a different average data rate requirement scenario. Curve 122 represents results from an RM algorithm, curve 124 represents results from an algorithm according to the technology disclosed herein and curve 126 represents results from a WMPF algorithm. FIG. 11 illustrates user satisfaction for a different average data rate requirement scenario. Curve 128 represents results from an algorithm according to the technology disclosed herein, curve 130 represents results from a WMPF algorithm and curve 132 represents results from an RM algorithm. The computational results achieved by simulations and presented in FIGS. 8 to 11 show that the present algorithm presents gains compared to the WMPF algorithm in the user satisfaction and total cell data rate when the users have the same and different data rate requirements. The RM algorithm is shown in the plot in order to show the upper bound in spectral efficiency.

One interesting point that can be observed by the simulation results was that the present algorithm turned out to be efficient in maximizing the user satisfaction in different scenarios simulated; both with users with equal and with users with different rate requirements.

Regarding the total cell data rate, we can see that the present algorithm outperformed the WMPF one. Therefore, besides the superiority in user satisfaction, the present algorithm utilizes the system resources in a more efficient way.

The embodiments described above are to be understood as a few illustrative examples of the technology disclosed herein. It will be understood by those skilled in the art that various modifications, combinations and changes may be made to the embodiments without departing from the scope of the technology disclosed herein. In particular, different part solutions in the different embodiments can be combined in other configurations, where technically possible. The scope of the technology disclosed herein is, however, defined by the appended claims.

REFERENCES

[1] Lu Yanhui, Wang Chunming, Yin Changchuan and Tue Guangxin, "Downlink Scheduling and Radio Resource Allocation in Adaptive OFDMA Wireless Communication Systems for User-Individual QoS," Transactions on Engineering, Computing and Technology—World Enformatika Society, March 2006.

[2] Tien-Dzung Nguyen and Youngnam Han, "A Proportional Fairness Algorithm with QoS Provision in Downlink OFDMA Systems," IEEE Communications Letters, v.10, n.11, November 2006.

[3] I. C. Wong, Zukang Shen, B. L. Evans and J. G. Andrews, "A Low Complexity Algorithm for Proportional Resource Allocation in OFDMA Systems," IEEE Workshop on Signal Processing Systems, pp. 1-6, October 2004.

[4] J. Gross and M. Bohge, "Dynamic Mechanisms in OFDM Wireless Systems: A Survey on Mathematical and System Engineering Contributions," Telecommunication Networks Group (TKN) Technical Report TKN-06-001, Technical University Berlin, Germany, May 2006.

[5] Hoon Kim, Keunyoung Kim, Youngnam Han and Sangboh Yun, "A Proportional Fair Scheduling for Multicarrier Transmission Schemes," IEEE Communications Letters, v.9, n.3, pp. 210-212, 2005.

The invention claimed is:

1. A method for resource allocation in a wireless communication system having a set of connected terminals, comprising the steps of:
   allocating transmission resources;
   said step of allocating transmission resources in turn comprises
      estimating, for each of said connected terminals, a requirement value representing an amount of required transmission resources for providing a required data rate for satisfying a minimum quality of service during a next transmission time interval for respective said connected termina;
      generating an allocation subset by including unsatisfied connected terminals from the set of connected terminals so that the sum of said requirement values of said included connected terminals of said allocation subset is not higher than available transmission resources in said next transmission time interval;
      said step of generating an allocation subset being performed by including connected terminals in an order according to said respective requirement values, starting with the less demanding requirement value among unsatisfied connected terminals; and
   assigning transmission resources of said next transmission time interval to connected terminals of said allocation subset;
   wherein said step of assigning of transmission resources is performed dependent on available link quality of a respective connected terminal of said allocation subset; and
   wherein said step of assigning of transmission resources in turn comprises the steps of:
      sorting said connected terminals of said allocation subset n an order of crescent average link quality;
      selecting a connected terminal of said sorted allocation subset having the lowest average link quality;
      assigning an available transmission resource unit of said transmission resources of said next transmission time interval, having a best link quality for said selected connected terminal, to said selected connected terminal;
      reducing said required data rate of said selected connected terminal by an amount corresponding to what is offered by said assigned transmission resource unit;
      selecting a next connected terminal of said sorted allocation subset having a requirement value larger than zero, in a round-robin fashion; and
      repeating said steps of assigning an available transmission resource unit, reducing said required data rate and selecting a next connected terminal until all transmission resource s are assigned or o connected terminals of said sorted allocation subset having a required data rate larger than zero is left.

2. The method according to claim 1, further comprising the step of removing satisfied connected terminals from said set into a subset of satisfied terminals, whereby said allocation subset is selected from a remaining set of unsatisfied connected terminals.

3. The method according to claim 1, wherein said estimating of a requirement value comprises estimating of a target data rate and calculating of said estimated requirement value based on said estimated target data rate and an available channel quality of a respective said connected terminal.

4. The method according to claim 3, wherein said estimated requirement value is an estimated target number of transmission resource units.

5. The method according to claim 1, comprising the further steps of:
   moving all unsatisfied connected terminals to said allocation subset, giving a replaced allocation subset comprising unsatisfied terminals not earlier included in said allocation subset by said generating step, if transmission resources of said next transmission time interval still are available after said step of assigning transmission resources; and
   repeating said step of assigning transmission resources.

6. The method according to claim 5, comprising the further steps of:
   moving all satisfied connected terminals to said allocation subset, if transmission resources of said next transmission time interval still are available after said step of assigning transmission resources of said replaced allocation subset; and
   repeating said step of assigning transmission resources.

7. The method according to claim 1, wherein said quality of service is related to a performance metric selected from session throughput and frame erasure rate.

8. The method according to claim 1, wherein said wireless communication system is an OFDMA system.

9. The method according to claim 1, wherein units of said transmission resources have an equal power allocation.

10. An arrangement for resource allocation in a wireless communication system having a set of connected terminals, the arrangement comprising at least one processor configured for allocating transmission resources by:
   estimating, for each of said connected terminals, of a requirement value representing an amount of required transmission resources for providing a required data rate for satisfying a minimum quality of service during a next transmission time interval for respective said connected terminal;
   generating of an allocation subset by including unsatisfied connected terminals from the set of connected terminals so that the sum of said requirement values of said included connected terminals of said allocation subset is not higher than available transmission resources in said next transmission time interval, wherein said generating of an allocation subset has access to said requirement value of said estimating;

wherein said generating of an allocation subset further includes connected terminals in an order according to said respective requirement values, starting with the less demanding requirement value among unsatisfied connected terminals; and said at least one processor being further configured for assigning of transmission resources of said next transmission time interval to connected terminals of said allocation subset, said assigning of transmission resources has access to said allocating of transmission resources;

wherein said assigning of transmission resources is arranged for performing assigning dependent on available link qualities of the respective connected terminals of said allocation subset: and wherein said assigning of transmission resources being further arranged for:
   sorting said connected terminals of said allocation subset in an order of crescent average link quality;
   selecting a connected terminal of said sorted allocation subset having the lowest average link quality;
   assigning an available transmission resource unit of said transmission resources of said next transmission time interval, having a best link quality for said selected connected terminal, to said selected connected terminal;
   reducing said required data rate of said selected connected transmission by an amount corresponding to what is offered by said assigned transmission resource unit;
   selecting a next connected terminal of said sorted allocation subset having a requirement value larger than zero, in a round-robin fashion; and
   repeating said steps of assigning an available transmission resource unit, reducing said required data rate and selecting a next connected terminal until all transmission resource units are assigned or no connected terminals of said sorted allocation subset having a required data rate larger than zero is left.

11. The arrangement according to claim 10, wherein said at least one processor is further configured for, in said allocating of transmission resources, further comprising removing of connected terminals having said requirement value lower than or equal to zero from said set into a subset of satisfied terminals, wherein said removing of connected terminals has access to said estimating of a requirement value, whereby said generating of an allocation subset operates on a remaining set of unsatisfied connected terminals.

12. The arrangement according to claim 10, wherein said at least one processor is further configured for, in said estimating of a requirement value, estimating of a target data rate and calculating said estimated requirement value based on said estimated target data rate and an available channel quality of a respective said connected terminal.

13. The arrangement according to claim 12, wherein said estimated requirement value is an estimated target number of transmission resource units.

14. The arrangement according to claim 10, wherein said at least one processor is further configured for, in said assigning of transmission resources:

moving all unsatisfied connected terminals to said allocation subset, giving a replaced allocation subset comprising unsatisfied terminals not earlier included in said allocation subset by said generating of an allocation subset, if transmission resources of said next transmission time interval still are available after said assigning of transmission resources; and performing said sorting, selecting of a connected terminal, assigning of an available transmission resource unit, reducing, selecting of a next connected terminal, and repeating with said replaced allocation subset of unsatisfied terminals.

15. The arrangement according to claim 14 wherein said at least one processor is further configured for, in said assigning of transmission resources:

moving all satisfied connected terminals to said allocation subset, if transmission resources of said next transmission time interval still are available after said of assigning of transmission resources of said replaced allocation subset; and performing said sorting, selecting of a connected terminal, assigning of an available transmission resource unit, reducing, selecting of a next connected terminal, and repeating with said replaced allocation subset of satisfied terminals.

16. The arrangement according to claim 10, wherein said quality of service is related to a performance metric selected from session throughput and frame erasure rate.

17. A node for use in a wireless communication system, said wireless communication system having a set of connected terminals, said node comprising at least one processor configured for allocating of transmission resources by:

estimating, for each of said connected terminals, a requirement value representing an amount of required transmission resources for providing a required data rate for satisfying a minimum quality of service during a next transmission time interval for respective said connected terminal;

generating an allocation subset by including unsatisfied connected terminals from the set of connected terminals so that the sum of said requirement values of said included connected terminals of said allocation subset is not higher than available transmission resources in said next transmission time interval, wherein said generating of an allocation subset has access to said requirement value of said estimating;

wherein said generating of an allocation subset further includes connected terminals in an order according to said respective requirement values, starting with the less demanding requirement value among unsatisfied connected terminals; and said at least one processor being further configured for assigning of transmission resources of said next transmission time interval to connected terminals of said allocation subset, said assigning of transmission resources has access to said allocating of transmission resources;

wherein said assigning of transmission resources is arranged for performing assigning dependent on available link qualities of the respective connected terminals of said allocation subset; and wherein said assigning of transmission resources being further arranged for:
   sorting said connected terminals of said allocation subset in an order of crescent average link quality;
   selecting a connected terminal of said sorted allocation subset having lowest average link quality;

assigning an available transmission resource unit of said transmission resources of said next transmission time interval, having a best link quality for said selected connected terminal, to said selected connected terminal;

reducing said required data rate of said selected connected terminal by an amount corresponding to what is offered by said assigned transmission resource unit;

selecting a next connected terminal of said sorted allocation subset having a requirement value larger than zero, in a round-robin fashion; and repeating said steps of assigning an available transmission resource unit, reducing said required data rate and selecting a next connected terminal until all transmission resource units are assigned or no connected terminals of said sorted allocation subset having a required data rate larger than zero is left.

18. A wireless communication system, comprising at least one of an arrangement and a node, said arrangement for resource allocation comprising at least one processor which is configured for allocating of transmission resources by:

estimating, for each of said connected terminals, of a requirement value representing an amount of required transmission resources for providing a required data rate for satisfying a minimum quality of service during a next transmission time interval for respective said connected terminal;

generating of an allocation subset by including unsatisfied connected terminals from the set of connected terminals so that the sum of said requirement values of said included connected terminals of said allocation subset is not higher than available transmission resources in said next transmission time interval, wherein said generating of an allocation subset has access to said requirement value of said estimating;

wherein said generating of an allocation subset further includes connected terminals in an order according to said respective requirement values, starting with the less demanding requirement value among unsatisfied connected terminals; and said at least one processor is further configured for assigning of transmission resources of said next transmission time interval to connected terminals of said allocation subset, said assigning of transmission resources has access to said allocating of transmission resources;

wherein said assigning of transmission resources is arranged for performing assigning dependent on available link qualities of the respective connected terminals of said allocation subset; and wherein said assigning of transmission resources being further arranged for:

sorting said connected terminals of said allocation subset n an order o crescent average link quality;

selecting a connected terminal of said sorted allocation subset having the lowest average link quality;

assigning an available transmission resource unit of said transmission resources of said next transmission time interval, having a best link quality for said selected connected terminal, to said selected connected terminal;

reducing said required data rate of said selected connected terminal by an amount corresponding to what is offered by said assigned transmission resource unit;

selecting a next connected terminal of said sorted allocation subset having a requirement value larger than zero, in a round-robin fashion; and repeating said steps of assigning an available transmission resource unit, reducing said required data rate and selecting a next connected terminal until all transmission resource units are assigned or o connected terminals of said sorted allocation subset having a required data rate larger than zero is left;

said node comprising an arrangement for resource allocation, in turn comprising at least one node processor configured for allocating of transmission resources by:

estimating, for each of said connected terminals, of a requirement value representing an amount of required transmission resources for providing a required data rate for satisfying a minimum quality of service during a next transmission time interval for respective said connected terminal;

generating of an allocation subset by including unsatisfied connected terminals from the set of connected terminals so that the sum of said requirement values of said included connected terminals of said allocation subset is not higher than available transmission resources in said next transmission time interval, wherein said generating of an allocation subset has access to said requirement value of said estimating;

wherein said generating of an allocation subset further includes connected terminals in an order according to said respective requirement values, starting with the less demanding requirement value among unsatisfied connected terminals; and said at least one node processor is further configured for assigning of transmission resources of said next transmission time interval to connected terminals of said allocation subset, said assigning of transmission resources has access to said allocating of transmission resources;

wherein said assigning of transmission resources is arranged for performing assigning dependent on available link qualities of the respective connected terminals of said allocation subset; and wherein said assigning of transmission resources being further arranged for:

sorting said connected terminals of said allocation subset in an order of crescent average link quality;

selecting a connected al of said sorted allocation subset having the lowest average link quality;

assigning an available transmission resource unit of said transmission resources of said next transmission time interval, having a best link quality for said selected connected terminal, to said selected connected terminal;

reducing said required data rate of said selected connected terminal by an amount corresponding to what is offered by said assigned transmission resource unit;

selecting a next connected terminal of said sorted allocation subset having a requirement value larger than zero, in a round-robin fashion; and repeating said steps of assigning an available transmission resource unit, reducing said required data rate and selecting a next connected terminal until all transmission resource units are assigned or no connected terminals of said sorted allocation subset having a required data rate larger than zero is left.

19. The wireless communication system according to claim 18, wherein said wireless communication system is an OFDMA system.

20. The wireless communication system according to claim 18, wherein units of said transmission resources have an equal power allocation.

* * * * *

UNITED STATES PATENT AND TRADEMARK OFFICE
CERTIFICATE OF CORRECTION

PATENT NO.       : 8,477,700 B2
APPLICATION NO.  : 12/600405
DATED            : July 2, 2013
INVENTOR(S)      : Dos Santos et al.

It is certified that error appears in the above-identified patent and that said Letters Patent is hereby corrected as shown below:

On Title Page 2, in Column 2, under "OTHER PUBLICATIONS", Line 7, delete "OFMDA" and insert -- OFDMA --, therefor.

In the Specifications

In Column 3, Line 34, delete "noticibility" and insert -- noticeability --, therefor.

In Column 10, Line 47-48, delete "terminal" and insert -- terminal. --, therefor.

In Column 11, Line 5, delete "technolopy" and insert -- technology --, therefor.

In Column 11, Line 22, delete "terminal" and insert -- terminal. --, therefor.

In the Claims

In Column 13, Line 43, in Claim 1, delete "termina;" and insert -- terminal; --, therefor.

In Column 13, Line 65, in Claim 1, delete "set n" and insert -- set in --, therefor.

In Column 14, Line 15, in Claim 1, delete "s are" and insert -- units are --, therefor.

In Column 14, Line 15, in Claim 1, delete "or o" and insert -- or no --, therefor.

In Column 15, Line 22, in Claim 10, delete "subset:" and insert -- subset; --, therefor.

In Column 15, Line 35, in Claim 10, delete "transmission" and insert -- terminal --, therefor.

Signed and Sealed this
Twenty-sixth Day of November, 2013

Margaret A. Focarino
*Commissioner for Patents of the United States Patent and Trademark Office*

In Column 16, Line 13, in Claim 15, delete "claim 14" and insert -- claim 14, --, therefor.

In Column 16, Line 67, in Claim 17, delete "having" and insert -- having the --, therefor.

In Column 17, Line 54, in Claim 18, delete "set n an order o" and insert -- set in an order of --, therefor.

In Column 18, Line 4, in Claim 18, delete "or o" and insert -- or no --, therefor.

In Column 18, Line 45, in Claim 18, delete "al" and insert -- terminal --, therefor.